United States Patent Office 3,769,411
Patented Oct. 30, 1973

3,769,411
FUNGICIDAL 1,2,4-4H-TRIAZOLE DERIVATIVES
Michael C. Seidel, Levittown, William C. von Meyer, Willow Grove, and Stanley A. Greenfield, Hatboro, Pa., assignors to Rohm and Haas Company, Philadelphia, Pa.
No Drawing. Filed Sept. 4, 1968, Ser. No. 757,490
Int. Cl. A01n 9/00
U.S. Cl. 424—269                                13 Claims

ABSTRACT OF THE DISCLOSURE

Substituted 1,2,4-4H-triazoles of the formula

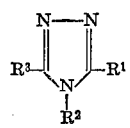

or a tautomeric form thereof, are fungicides particularly useful for the control of rusts. Certain of these compounds are systemic in action giving excellent control of cereal rusts, notably wheat rust, and are particularly effective as seed treatments.

---

This invention is concerned with substituted 1,2,4-4H-triazoles which possess fungicidal properties useful for the control of fungal diseases on plants and to agricultural compositions containing them. It also relates to certain of these 1,2,4-4H-triazoles which are novel compounds and to their method of preparation. Further it relates to a segment of these 1,2,4-4H-triazoles which are useful as systemic fungicides for the control of rust diseases, particularly on cereal crops.

The chemistry of the 1,2,4-triazoles has been reviewed by K. T. Potts in Chemical Reviews 61, 87–127 (1961). A relatively few such compounds are known to possess biological properties. 3-amino-1,2,4-triazole is a commercial herbicide and thiocarbamyl derivatives of this possess fungicidal properties useful for paints and the like according to French Pat. 1,425,253. Japanese patent publication 11,480/66 disclosed certain 3-mercapto-4-amino-5-(substituted-methyl) - 1,2,4-4H-triazoles as fungicides. 5-amino-1-[bis(dimethylamino)-phosphenyl] - 3 - phenyl-1,2,4-triazole is a known fungicide. U.S. Pat. 3,308,131 discloses among others 3-mercapto-1-(substituted-carbamyl)-1,2-triazoles useful as insecticides.

Relatively few compounds are known to control fungal rust organisms and still fewer which control them by systemic action. Rust fungicides include symmetrical-dichlorotetrafluoroacetone, ethylenebisdithiocarbamates, nickel compounds, phenylhydrazones, cycloheximide and certain carboxamido oxathiins.

The substituted 1,2,4-4H-triazoles of this invention which have been found useful as fungicides for the control of phytopathogenic fungi are represented by the general formula

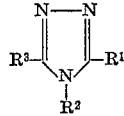

(I)

wherein $R^1$ is hydrogen or —SA wherein A is (a) hydrogen,
(b) lower alkyl groups and lower alkyl groups substituted by halogen, preferably chlorine, lower alkoxy, cyano, hydroxy or nitro; aryloxy; alkoxy, alkyl, halo or nitro substituted aryloxy; aryl; alkoxy, alkyl, halo preferably chloro or nitro substituted aryl; benzoyl and halo preferably chloro, alkoxy, alkyl or nitro substituted benzoyl, (c) the group —C(X)R$^4$ wherein X is O or S and $R^4$ is selected from the group consisting of aryl, lower alkyl substituted aryl, lower alkoxy substituted aryl, halo and nitro substituted aryl, furoyl, and the group —NR$^5$R$^6$ wherein $R^5$ and $R^6$ may be hydrogen or lower alkyl groups, (d) the group —CH$_2$C(O)NR$^5$R$^6$ wherein $R^5$ and $R^6$ have the above meaning, (e) the group —CH(OH)R$^7$ wherein $R^7$ is hydrogen, lower alkyl or lower halo-substituted alkyl, (f) the group

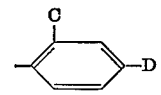

wherein C and D are hydrogen and a meta-directing group such as cyano, nitro, sulfonic acid and sulfonic acid derivatives with the provisio that only one of C and D may be hyrdogen, (g) salt-forming metals such as the alkali and alkaline earth metals, cadmium, copper, iron, manganese, nickel and zinc;

$R^2$ is alkyl of 1–18 carbon atoms which may be substituted with one or more halo preferably chloro, lower alkoxy, hydroxy or nitro groups; cycloalkyl of 3–8 carbon atoms which may be substituted with one or more halo preferably chloro, hydroxy or nitro groups; aralkyl of up to 10 carbon atoms; aralkyl of up to 10 carbon atoms substituted in the aryl group with lower alkyl, halo preferably chloro, and nitro groups; aryl; and lower alkyl, halo preferably chloro, and nitro substituted aryl; and $R^3$ is hydrogen, alkyl of 1–18 carbon atoms, hydroxy, furyl, and the group —COOB wherein B is hydrogen, alkyl of 1–12 carbon atoms, ammonium, ammonium monosubstituted with lower alkyl or lower hydroxyalkyl, ammonium disubstituted with lower alkyl or lower hydroxyalkyl, ammonium trisubstituted with lower alkyl or lower hydroxyalkyl, quaternary ammonium and salt-forming metals; and acid salts of the basic substituted 1,2,4-4H-triazoles prepared from mineral acids such as fluoboric, hydrobromic, hydrochloric, nitric, phosphoric and sulfuric and from mono and polybasic organic acids such as acetic, chloroacetic, acrylic, toluene-sulfonic, oxalic and maleic.

When the term "lower" is employed in conjunction with alkyl and alkoxy as above it is intended to indicate that the alkyl or alkyl portion thereof has a carbon content of 1 to 5 carbon atoms. Alkyl groups as referred to for Formula I may be straight or branched chain.

Compounds of Formula I in which $R^1$ is SH may exist in tautomeric form; thus,

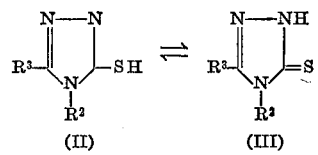

(II)         (III)

Formula II is a 1,2,4-4H-triazole whereas Formula III is more properly known as a Δ$^2$-1,2,4-triazoline-5-thione. Compounds derived from such a tautomeric mixture by introduction of an A group, as defined above except possibly for metallic salts, could therefore exist as

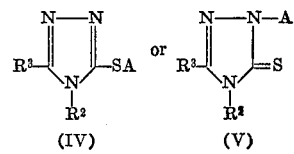

(IV)         (V)

or as mixtures of these. However, for the present purpose these compounds will be referred to as 1,2,4-4H-triazoles.

Further when R³ is OH two additional tautomers are possible, thus,

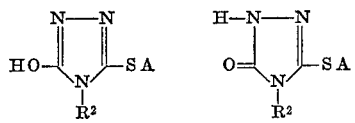

It is quite probable that the major component is in the lactam form; however, for the present purpose the 5-hydroxy-1,2,4-4H-triazole form will be used. For a general discussion of tautomeric compounds and of the isomers that may result from synthetic procedures for producing triazoles reference is made to Elderfield, "Heterocyclic Compounds," John Wiley, New York, 1957, vol. V, pp. 91–92.

Various methods are available for the preparation of the compounds of Formula I.

(A) For the compounds where R¹ and R³ are hydrogen,

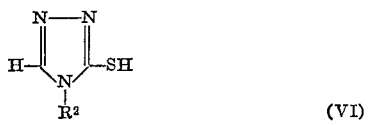 (VI)

The method of Bartlett and Humphrey J. Chem. Soc. 1967, 1664–1666, involving a transamination of N,N-dimethylformamide azine may be used; thus

The reaction usually involves heating to remove the dimethylamine and may be run in the presence of a solvent such as an aromatic hydrocarbon. An acidic catalyst may be used.

The method of Pellizzari (Chemical Reviews 61, 95 (1961)) involves diformhydrazide with primary amines; thus

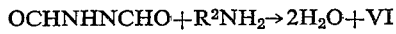

(B) For the compounds where R¹ is SH and R³ is hydrogen,

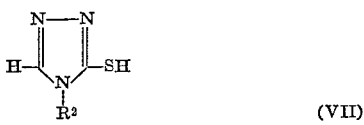 (VII)

This involves reaction of hydrazine with an isothiocyanate (R²NCS) to produce a semicarbazide which is then formylated followed by cyclization in the presence of a base catalyst; thus

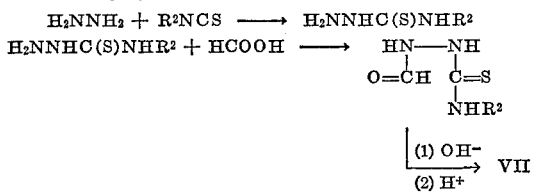

This General method is described in Organic Sytheses 40, 99 (1960) and Kroger, Sattler and Beyer Analen 643, 128 (1961). The formation of the semi carbazide and its formylation are standard type reactions, e.g. see Lieber, Pillai and Hites Canadian Journal of Chemistry 35, 832 (1957). These intermediates may, if desired, be isolated prior to the cyclization reaction. The cyclization reaction may be conveniently carried out in the presence of a base catalyst. Cyclization may be optimized by the use of from 2 to 3 equivalents of the base catalyst. The cyclization catalyst can be selected from inorganic base catalysts such as metal hydroxides, carbonates and bicarbonates, or organic base catalysts such as triethylamine, pyridine and N,N-dimethyl-aniline. Sodium hydroxide is a readily available base catalyst for use in the cyclization reaction.

Since the intermediate products prior to cyclization are usually solids, a reaction solvent is usually necessary. The cyclization reaction may be conveniently carried out in any solvent medium that is inert under the reaction conditions. Suitable solvents are water, alcohols such as methanol, butanol and propanol, benzene, hexane, or other suitable inert organic solvents such as dimethylformamide, ether, dimethylsulfoxide, etc.

The cyclization reaction temperature is not critical. Temperatures in the range of −10° C. to 100° C. may be used, with temperatures in the range of 25° to 75° C. being preferred.

An alternate procedure for producing compounds of Formula VII is to react the intermediate semicarbazide with ethyl formate in the presence of an alkali alkoxide, such as sodium methoxide, and heating the mixture to produce the 1,2,4-triazole; thus

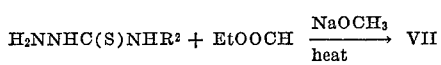

The general method is described by Pesson, Polmanss and Dupin Compt. rend. 248, 1677 (1959).

The removal of the mercapto group in a 1,2,4-triazole by oxidation, such as with nitric acid, or hydrogen peroxide is known from the work of Wohl and Marchwald, Berichte 22, 576 (1889). Thus compounds of Formula VI may be produced from those of Formula VII.

(C) For the compounds where R¹ is SH and R³ is a group other than hydrogen or carboxyl,

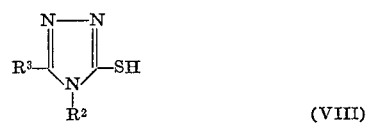 (VIII)

The cyclization of a 1-acyl-4-substituted thiosemicarbazide with an alkaline substance or by heat has been studied as an efficient route to compounds of Formula VIII (Chemical Reviews 61, 99 (1961)); thus

An alternate procedure involves the reaction of a 4-substituted thiosemicarbazide with an acid ester, e.g. the ethyl ester, in the presence of a sodium alkoxide, e.g. sodium ethoxide; thus

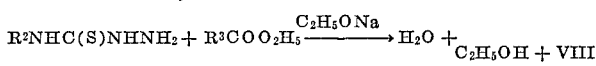

When in the above reaction the acid ester is a carbonate, such as ethyl carbonate, the resulting compound contains an OH group as the R³ substituent,

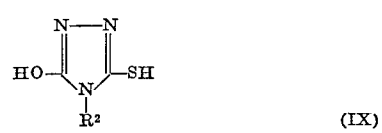 (IX)

(D) For the compounds where R¹ is SH and R³ is COOH,

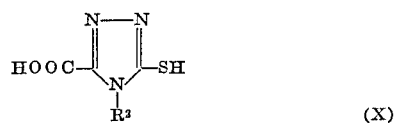 (X)

This method involves reaction of a dialkyl oxalate such as diethyl oxalate with hydrazine to produce an alkyloxalyl hydrazide, which is then reacted with an isothiocyanate (R²NCS) to produce a semicarbazide, followed by cyclization in the presence of a base catalyst such as sodium alkoxide or triethylamine. This produces the carboxylic ester of the Formula X compound, which upon acid hydrolysis gives the free acid. This may be illustrated with diethyl oxalate, thus $$EtOOC\text{—}COOEt + H_2NNH_2 \longrightarrow$$
$$EtOOCC(O)NHNH_2$$
$$\downarrow + R^2NCS$$
$$EtOOCC(O)NHNHC(S)NHR^2$$
$$\downarrow \text{base catalyst}$$

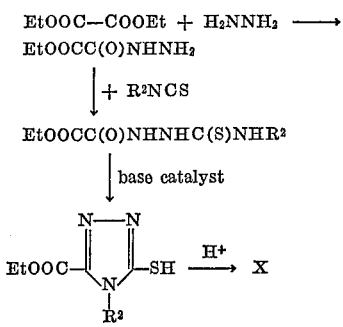

In this reaction it has been found that the formation of the alkyloxalyl hydrazide intermediate is enhanced by conducting the reaction at reduced temperatures, e.g. −10° C. to 10° C. Further, reaction and storage temperature conditions are more important with regard to the stability of the 1,2,4-triazoles having a carboxy group in the 5-position, i.e. when $R^3$ is COOH. These compounds are readily decarboxylated when held at 130° C. for about 30 minutes or at about 45° C. for about 4 hours. An acid catalyst often produces decarboxylation under milder conditions. Thus, decarboxylation of compounds of Formula X is another way of preparing compounds of Formula VII.

(E) Compounds of the type

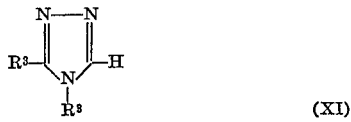

may be prepared by removal of the mercapto group of compounds of Formula VIII and IX by reaction with oxidizing agents such as nitric acid or hydrogen peroxide.

(F) Salts of various of the substituted 1,2,4-triazoles may be made by methods known to one skilled in the art. Thus, (1) The basic 1,2,4-triazoles may be reacted with mineral and organic acids, e.g. see Ainsworth et al. J. Med. Pharm. Chem. 5, 383 (1962).

(2) Those compounds where $R^1$ is SH group may be reacted with bases such as alkali and alkaline earth hydroxides, oxides and carbonates. Of the alkali salts the sodium salt is preferred. The relatively insoluble heavy metal salts may be made by reacting a water-soluble salt of the heavy metal with a water-soluble salt of the 1,2,4-triazole.

(3) Those compounds where $R^3$ is carboxy may be reacted with metallic bases such as alkali and alkaline earth hydroxides, oxides and carbonates; ammonia and quaternary ammonium hydroxide; and amines. For some salts such as quaternary ammonium and heavy metal ones it is convenient to react a water-soluble quaternary ammonium or metal salt with a water-soluble salt of the 1,2,4-triazole.

(G) Derivatives of the 1,2,4-triazoles containing a 3-mercapto group, i.e., where $R^1$ in Formula I is SA, may be made by methods known to one skilled in the art. Thus, (1) Where A is alkyl; alkyl substituted with various groups such as alkoxy and aryloxy; aralkyl and substituted aralkyl; the group —$CH_2C(O)NR^5R^6$ and the

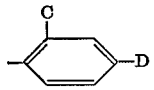

group as defined above, the compounds may be made by reaction of the respective halides with a salt of the 3-mercapto-1,2,4-triazole.

(2) Where A is an acyl group such as a benzoyl, furoyl group, carbamoyl or thiocarbamoyl, the acyl halides may be reacted with a salt of the 3-mercapto-1,2,4-triazole.

(3) Where A is a lower cyanoalkyl group, the mercapto group of the 1,2,4-triazole of compounds of Formula I, VII and VIII may be reacted with an olefinic nitrile such as acrylonitrile or methacrylonitrile. In some instances compounds of Formula V are known to result and this is particularly true for compounds which give a Michael type addition such as acrylonitrile, methacrylonitrile, acrylic acid, maleic acid, nitroethylene and nitrostyrene. A cyano group can also be introduced by other means known in the art such as replacement of a halo atom by reaction with a cyanide salt or by dehydration of a carbamoyl group.

(4) Where A is a —$C(O)NHR^5$ or —$C(S)NHR^5$ group the mercapto 1,2,4-triazoles may be reacted with an isocyanate ($R^5NCO$) or isothiocyanate ($R^5NCS$).

Details of preparing the compounds of this invention are given in the following examples which are presented for purposes of illustration and are not intended to limit the scope of the invention. Table I lists by structure and name, compounds prepared by the above-described processes and constitutes Examples 1 through 53. Table II gives physical characteristics and analyses or literature references for these examples. Specific illustrative preparations of Examples 10, 17, 22, 24, 28, 35, 36, 39, 41, 43, 48 and 49 are set forth below.

EXAMPLE 10

Preparation of 3-mercapto-4-n-butyl-1,2,4-triazole 4-n-butylthiosemicarbazide (20.0 g. or 0.136 mole) was heated to reflux with a solution of methanol (100 ml.), sodium methoxide (7.55 g. or 0.140 mole) and ethyl formate (20.7 g. or 0.280 mole). After 8 and 16 hours, 10 ml. and 5 ml. of ethyl formate was added to the refluxing solution. After 24 hours total reflux, the solvent was removed under reduced pressure and the residue was dissolved in water (100 ml.). The pH of the solution was adjusted to about 12 with 50% sodium hydroxide solution. This solution was then heated on a steam bath for 45 minutes, cooled and acidified with dilute hydrochloric acid. The resulting oil was extracted into ether. The ether was dried over sodium sulphate and removed under vacuum. The resulting oil was crystallized from ether-hexane to give 11.8 g. (55% yield) of 3-mercapto-4-n-butyl-1,2,4-triazole, M.P. 67–69° C. The structure was confirmed by its nuclear magnetic resonance spectrum and its mass spectrum.

EXAMPLE 17

Preparation of 3-mercapto-4-cyclohexyl-1,2,4-triazole

Formic acid (90%, 100 ml.) was heated on a steam bath for 15 minutes and then 4-cyclohexylthiosemicarbazide (30 g. or 0.174 mole) was added portionwise. The resulting clear solution was then heated for an additional 60 minutes, diluted with water (50 ml.) and allowed to cool at 0° C. A precipitate was formed. The precipitate (13 g. or 0.065 mole) was collected and added to a solution of sodium hydroxide (2.6 g. or 0.065 mole) in water (25 ml.) and heated on a steam bath for 60 minutes. The solution was cooled and acidified to pH 2 with dilute hydrochloric acid. The precipitate was collected and recrystallized from ethanol to give 5.3 g. of solid M.P. 162–165° C. The mother liquors from the crystallization were concentrated to give an additional 4.3 g., M.P. 162–165° C. The total yield was 9.3 g. (78%) of 3-mercapto-4-cyclohexyl-1,2,4-triazole. The structure was confirmed by its nuclear magnetic resonance spectrum and its mass spectrum.

EXAMPLE 22

Preparation of 3-mercapto-4-phenyl-5-hydroxy-1,2,4-triazole

To a solution of 65 g. (0.48 mole) of phenyl isothiocyanate in 350 cc. of ether was added 50 g. (0.48 mole) of ethyl carbazate with stirring. The resulting mixture was heated on a steam bath for 0.5 hr. The precipitate was filtered off and recrystallized from ethanol:water (1:1) to give white crystals melting at 145°–146° C. Forty grams of this solid were heated with 240 cc. of 10% KOH on a steam bath for 30 min. The reaction mixture was cooled and acidified with 50% hydrochloric acid to give 25 g. of crude, air-dried solid. This was recrystallized from acetone to give 18 g. of solid melting at 135°–136° C. It is 3-mercapto-4-phenyl-5-hydroxy-1,2,4-triazole, or a tautomer thereof, containing one-half molecule of water of hydration.

EXAMPLE 24

Preparation of 3-mercapto-4-methyl-5-(2-furyl)-1,2,4-triazole (A) Preparation of 1-(2-furoyl)-4-methyl thiosemicarbazide.—Furoyl chloride (31 g. or 0.238 mole) was added dropwise to a slurry of 4-methylthiosemicarbazide (25 g. or 0.238 mole) in dry pyridine (200 ml.) cooled to −10°. The slurry was allowed to come to ambient temperature and stirred overnight. The reaction mixture was poured into 1500 ml. of crushed ice, the precipitate was collected, dried and recrystallized from EtOH to give 1-(2-furoyl)-4-methyl thiosemicarbazide (28.0 g.). This melted at 204–206° C. (dec.) and was found to contain by analysis 42.4% C, 4.6% H, 21.2% N, 16.1% O, 15.9% S; $C_7H_9N_3O_2S$ requires 42.2% C, 4.5% H, 21.1% N, 16.1% O, 16.1% S. The structure was confirmed by its infrared spectrum and nuclear magnetic resonance spectrum.

(B) Conversion of 1-(2-furoyl)-4-methyl thiosemicarbazide into 3-mercapto-4-methyl-5-(2-furoyl)-1,2,4-triazole.—The above thiosemicarbazide (28 g. or 0.141 mole) in methanol (300 ml.) was refluxed overnight in the presence of sodium methoxide (15.2 g. or 0.282 mole). The solvent was then removed under vacuum and the residue was diluted with water (150 ml.). The solution was then acidified with hydrochloric acid, the precipitate was collected, washed with water and dried. The solid was recrystallized from ethanol to give 3-mercapto-4-methyl-5-(2-furyl)-1,2,4-triazole melting at 192°–194° C. The structure was confirmed by its infra-red spectrum and nuclear magnetic resonance spectrum.

EXAMPLE 28

Preparation of 3-mercapto-4-n-butyl-5-carboxy-1,2,4-triazole (A) Preparation of 1-ethyl oxalyl-4-n-butylthiosemicarbazide.—To a methanolic solution (200 ml.) of diethyl oxalate (100 g. or 0.683 mole) was added a methanolic solution (200 ml.) of hydrazine hydrate (22.9 g. or 0.68 mole). The addition occurred over a two hour period during which period the reaction temperature was maintained at about −5° C. When the addition was completed n-butyl isothiocyanate (78.4 g. or 0.68 mole) was added at −5° C. The cloudy solution was stirred at ambient temperatures for 18 hours. The reaction mixture was filtered, evaporated under reduced pressures to one-half the original volume, and diluted with water (700 ml.). The resulting precipitate was filtered and air dried to give 154.4 g. (92% yield) of 1-ethyl oxalyl-4-n-butyl-thiosemicarbazide, M.P. 127–28° C. It was found to contain by analysis 38.76% C, 6.23% H, 19.27% N and 14.83% S; calculated for $C_7H_{11}N_3O_2S \cdot H_2O$ is 38.33% C, 5.98% H, 19.16% N and 14.63% S.

(B) Conversion of 1-ethyl oxalyl-4-n-butylthiosemicarbazide into 3-mercapto-4-n-butyl-5-carboxyl-1,2,4-triazole.—The thiosemicarbazide (125.0 g. or 0.507 mole) formed above was added to a solution of sodium hydroxide (45.0 g. or 1.125 moles) in water (500 ml.). After 16 hours at ambient temperature, the solution was warmed to 60° C. and cooled. Dilute (37%) hydrochloric acid (112.0 g. or 1.135 moles) was then added cautiously to avoid foaming. The resulting precipitate was filtered and dried at 45° C. in a vacuum oven to give the crude acid (96.5 g., 86% yield), M.P. 120–122° C. The acid was recrystallized from water (800 ml.) and dried to give essentially pure 3-mercapto-4-butyl-5-carboxyl-1,2,4-triazole (67.4 g., 61% yield), M.P. 108–110° C. The structure was confirmed by its nuclear magnetic resonance spectrum and infrared spectrum.

EXAMPLE 35

Preparation of 3-methylmercapto-4-n-butyl-1,2,4-triazole

Iodomethane (9.05 g. or 0.0637 mole) was added to a solution of 10 g. of 3-mercapto-4-n-butyl-1,2,4-triazole, methanol (100 ml.), and sodium hydroxide (2.55 g. or 0.0637 mole). This solution was then refluxed for 2 hours. The solvent was then removed in vacuum and the residue was dissolved in benzene. This solution was washed with water, dried and the benzene removed in vacuum. The residual oil was distilled to give 3-methylmercapto-4-n-butyl-1,2,4-triazole, B.P. 128–131° C./2 mm. The structure was confirmed by its nuclear magnetic resonance spectrum.

EXAMPLE 36

Cyanoethylation of 3-mercapto-4-n-butyl-1,2,4-triazole

Acrylonitrile (12 g. or 0.224 mole) was added dropwise to a dioxane (30 ml.) solution of 3-mercapto-4-n-butyl-1,2,4-triazole (10 g. or 0.0638 mole) in the presence of a 40% aqueous solution of benzyltrimethylammonium hydroxide (1 ml.). The dark red solution was left standing overnight, and the solvent was removed in vacuum. The tarry residue was taken up in ether, washed with water, dried, and evaporatde to dryness. The resulting oil was distilled to give an oil distilling at 168–175° C./2 mm. Ultraviolet spectra and the teachings of Postoviskii and Shegal, Chemical Abstracts 63, 13242, 1965 indicate this to be 2-(2-cyanoethyl)-4-n-butyl-1,2,4-triazoline-3-thione.

EXAMPLE 39

Preparation of 3-(1-hydroxy-2,2,2-trichloroethylmercapto)-4-n-butyl-1,2,4-triazole 3-mercapto-4-n-butyl-1,2,4-triazole (2.0 g. or 0.0127 mole) and chloral (3.68 g. or 0.0254 mole) were heated in benzene (30 ml.) until a precipitate formed (10 minutes). The mixture was cooled, the precipitate was collected, dried, and recrystallized from ether-hexane to give 3 - (1 - hydroxy - 2,2,2 - trichloroethylmercapto) - 4 - n-butyl 1,2,4-triazole melting at 95°–97° C. The structure was confirmed by its nuclear magnetic resonance spectrum.

EXAMPLE 41

Preparation of 3-(4-methoxybenzylmercapto)-4-n-butyl-1,2,4-triazole

To a mixture of 10 g. (0.064 mole) of 3-mercapto-4-n-butyl-1,2,4-triazole and 2.6 g. (0.064 mole) of sodium hydroxide in 200 ml. of methanol was added 9.9 g. (0.064 mole) of p-methoxybenzyl chloride. The reaction mixture was heated at reflux about 20 hours. The solvent was evaporated off, the residue washed with water, dried and distilled. There was obtained 17.8 g. of yellow liquid distilling at 190°–205° C. at 0.03 mm. Nuclear magnetic resonance and ultraviolet spectra indicated this to be approximately an equal mixture of 3-(4-methoxybenzylmercapto)-4-n-butyl-1,2,4-triazole and 4 - n - butyl-2-(4-methoxybenzyl)-1,2,4-triazoleine-3-thione.

EXAMPLE 43

Preparation of 3-methylcarbamoylmercapto-4-n-butyl-1,2,4-triazole

To 6.0 g. (0.0382 mole) of 3-mercapto-4-n-butyl-1,2,4-triazole dissolved in 50 ml. of ether was added 2.5 g. (0.248 mole) of triethylamine and then 2.5 g. (0.0438 mole) of methyl isocyanate. The resulting orange-brown solution was allowed to stand overnight. The solid which formed was filtered and washed twice with 50 ml. of ether to give 4.7 g. (57% yield) of 3-methyl-carbamoylmercapto-4-n-butyl-1,2,4-triazole melting at 112°–114° C.

EXAMPLE 48

Preparation of 3-furoylmercapto-4-butyl-1,2,4-triazole 3-mercapto-4-n-butyl-1,2,4-triazole (10 g. or 0.064 mole) was added to a solution of sodium hydroxide (2.6 g. or 0.064 mole) in methanol (200 ml.). The solution was evaporated to dryness under reduced pressure, benzene (100 ml.) was added, and the slurry concentrated to dryness to yield the sodium salt of the triazole. The salt was slurried in benzene (200 ml.) and furoyl chloride (8.5 g. or 0.065 mole) was added and the slurry was heated to reflux for 2 hours. After cooling to room temperature the benzene was washed with water, 5% sodium hydroxide solution, water, dried over sodium sulfate and evaporated to dryness. The solid was recrystallized from benzene to give 3-furoylmercapto-4-n-butyl-1,2,4-triazole melting at 102°–105° C. The structure was confirmed by its infrared spectrum and nuclear magnetic resonance spectrum.

EXAMPLE 49

Preparation of 3-(p-methoxyphenacylmercapto)-4-n-butyl-1,2,4-triazole

To a solution of 3-mercapto-4-n-butyl-1,2,4-triazole (10 g. or 0.063 mole) and sodium hydroxide (2.55 g. or 0.0637 mole) in 200 ml. of methanol was added α-bromo-p-methoxyacetophenone (15.3 g. or 0.067 mole). The reaction mixture was heated at reflux for 16 hours and the solvent removed in vacuum to leave a solid residue. The solid was washed with water and recrystallized from benzene-hexane to give 3-(p-methoxy-phenacylmercapto)-4-n-butyl-1,2,4-triazole melting at 79°–82° C. The structure was confirmed by its infrared and nuclear magnetic spectra.

TABLE I 1,2,4-triazole examples

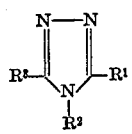

| Ex. No. | R¹ | R² | R³ | Name |
|---|---|---|---|---|
| 1 | H | n-C₃H₇ | H | 4-n-propyl-1,2,4-triazole. |
| 2 | H | n-C₄H₉ | H | 4-n-butyl-1,2,4-triazole. |
| 3 | H | n-C₆H₁₃ | H | 4-n-hexyl-1,2,4-triazole. |
| 4 | H | n-C₁₀H₂₁ | H | 4-n-decyl-1,2,4-triazole. |
| 5 | H | —CH₂CH₂CH₂OCH₃ | H | 4-(3-methoxypropyl-1,2,4-triazole. |
| 6 | H | —CH₂C₆H₅ | H | 4-benzyl-1,2,4-triazole. |
| 7 | SH | CH₃ | H | 3-mercapto-4-methyl-1,2,4-triazole. |
| 8 | SH | C₂H₅ | H | 3-mercapto-4-ethyl-1,2,4-triazole. |
| 9 | SH | n-C₃H₇ | H | 3-mercapto-4-n-propyl-1,2,4-triazole. |
| 10 | SH | n-C₄H₉ | H | 3-mercapto-4-n-butyl-1,2,4-triazole. |
| 11 | SH | t-C₄H₉ | H | 3-mercapto-4-t-butyl-1,2,4-triazole. |
| 12 | SH | n-C₅H₁₁ | H | 3-mercapto-4-n-pentyl-1,2,4-triazole. |
| 13 | SH | n-C₆H₁₃ | H | 3-mercapto-4-n-hexyl-1,2,4-triazole. |
| 14 | SH | n-C₈H₁₇ | H | 3-mercapto-4-n-octyl-1,2,4-triazole. |
| 15 | SH | t-C₈H₁₇ | H | 3-mercapto-4-t-octyl-1,2,4-triazole. |
| 16 | SH | n-C₁₀H₂₁ | H | 3-mercapto-4-n-decyl-1,2,4-triazole. |
| 17 | SH | Cyclohexyl | H | 3-mercapto-4-cyclohexyl-1,2,4-triazole. |
| 18 | SH | —CH₂C₆H₅ | H | 3-mercapto-4-benzyl-1,2,4-triazole. |
| 19 | SH | Phenyl | H | 3-mercapto-4-phenyl-1,2,4-triazole. |
| 20 | SH | CH₃ | OH | 3-mercapto-4-methyl-5-hydroxy-1,2,4-triazole. |
| 21 | SH | C₄H₉ | OH | 3-mercapto-4-n-butyl-5-hydroxy-1,2,4-triazole. |
| 22 | SH | C₆H₅ | OH | 3-mercapto-4-phenyl-5-hydroxy-1,2,4-triazole. |
| 23 | SH | C₄H₉ | CH₃ | 3-mercapto-4-n-butyl-5-methyl-1,2,4-triazole. |
| 24 | SH | CH₃ | 2-furyl | 3-mercapto-4-methyl-5-(2-furyl)-1,2,4-triazole. |
| 25 | SH | C₄H₉ | 2-furyl | 3-mercapto-4-n-butyl-5-(2-furyl)-1,2,4-triazole. |
| 26 | SH | Phenyl | 2-furyl | 3-mercapto-4-phenyl-5-(2-furyl)-1,2,4-triazole. |
| 27 | SH | CH₃ | COOH | 3-mercapto-4-methyl-5-carboxy-1,2,4-triazole. |
| 28 | SH | C₄H₉ | COOH | 3-mercapto-4-n-butyl-5-carboxy-1,2,4-triazole. |
| 29 | SH | C₄H₉ | COOH·(HOCH₂CH₂)₃N | Triethanolamine salt of 3-mercapto-4-n-butyl-5-carboxy-1,2,4-triazole. |
| 30 | SH | C₄H₉ | COOC₂H₅ | 3-mercapto-4-n-butyl-5-carbethoxy-1,2,4-triazole. |
| 31 | SNa | C₄H₉ | COOC₂H₅ | Sodium salt of 3-mercapto-4-butyl-5-carbethoxy-1,2,4-triazole. |
| 32 | —SC(O)NHCH₃ | C₄H₉ | COOH | 3-methylcarbamoylmercapto-4-n-butyl-5-carboxy-1,2,4-triazole. |
| 33 | —SC(O)NHCH₃ | C₄H₉ | COOH·(HOCH₂CH₂)₃N | Triethanolamine salt of 3-methylcarbamoylmercapto-4-n-butyl-5-carboxy-1,2,4-triazole. |
| 34 | —SC(S)N(CH₃)₂ | C₄H₉ | COOH | 3-dimethylthiocarbamoylmercapto-4-n-butyl-5-carboxy-1,2,4-triazole. |
| 35 | —SCH₃ | C₄H₉ | H | 3-methylmercapto-4-n-butyl-1,2,4-triazole. |
| 36 | | Product from the cyanoethylation of Example 10 | | 2-(2-cyanoethyl)-4-n-butyl-1,2,4-triazoline-3-thione. |
| 37 | —SCH₂CH₂OC₂H₅ | C₄H₉ | H | 3-2-ethoxyethylmercapto)-4-n-butyl-1,2,4-triazole. |
| 38 | —SCH₂CH₂OC₆H₅ | C₄H₉ | H | 3-(2-phenoxyehtylmercapto)-4-n-butyl-1,2,4-triazole. |
| 39 | —SCH(OH)CCl₃ | C₄H | H | 3-(1-hydroxy-2,2,2-trichloroethylmercapto)-4-n-butyl-1,2,4-triazole. |
| 40 | —SCH₂CONH₂ | C₄H₉ | H | 3-carbamoylmethylmercapto-4-n-butyl-1,2,4-triazole. |
| 41 | —SCH₂C₆H₄OCH₃-4 | C₄H₉ | H | 3-(4-methoxybenzylmercapto)-4-n-butyl-1,2,4-triazole admixed with 4-n-butyl-2-(4-methoxybenzyl)-1,2,4-triazoline-3-thione. |
| 42 | —SC₆H₃(NO₂)₂-2,4 | C₄H₉ | H | 3-(2,4-dinitrophenylmercapto)-4-n-butyl-1,2,4-triazole. |
| 43 | —SCONHCH₃ | C₄H₉ | H | 3-methylcarbamoylmercapto-4-n-butyl-1,2,4-triazole. |
| 44 | —SCOC₆H₄Br-2 | C₄H₉ | H | 3-(2-bromobenzoylmercapto)-4-n-butyl-1,2,4-triazole. |
| 45 | —SCOC₆H₄Br-4 | C₄H₉ | H | 3-(4-bromobenzoylmercapto)-4-n-butyl-1,2,4-triazole. |
| 46 | —SCOC₆H₄OCH₃-4 | C₄H₉ | H | 3-(4-methoxybenzoylmercapto)-4-n-butyl-1,2,4-triazole. |

TABLE I—Continued

| Ex. No. | R¹ | R² | R³ | Name |
|---|---|---|---|---|
| 47 | —SCOC₆H₄NO₂-3 | C₄H₉ | H | 3-(3-nitrobenzoylmercapto)-4-n-butyl-1,2,4-triazole. |
| 48 | —SCOCH=CHCH=CH—O (cyclic) | C₄H₉ | H | 3-furoylmercapto-4-n-butyl-1,2,4-triazole. |
| 49 | —SCH₂COC₆H₄OCH₃-4 | C₄H₉ | H | 3-(p-methoxyphenacylmercapto)-4-n-butyl-1,2,4-triazole. |
| 50 | Product from the cyanoethylation of Example 19 | | | 2-(2-cyanoethyl)-4-phenyl-1,2,4-triazoline-3-thione. |
| 51 | —SC₆H₃(NO₂)₂-2,4 | Phenyl | H | 3-(2,4-dinitrophenylmercapto)-4-phenyl-1,2,4-triazole. |
| 52 | —SCOC₆H₄OCH₃-4 | Phenyl | H | 3-(4-methoxybenzoylmercapto)-4-phenyl-1,2,4-triazole. |
| 53 | —SCOC₆H₄NO₂-3 | Phenyl | H | 3-(3-nitrobenzoyl)-4-phenyl-1,2,4-trizaole. |

TABLE II.—CHARACTERIZATION OF EXAMPLES

| Example number | Melting point (° C.) | Empirical formula | Analysis or literature reference C | H | N | S |
|---|---|---|---|---|---|---|
| 1 | 120-125/.6 mm.ᵃ | C₅H₉N₃ | 52.8 (54.) | 8.8 (8.1) | 37.2 (37.9) | |
| 2 | 130-142/.2 mm.ᵃ | | J. Chem. Soc. (C). 1967. 1665 | | | |
| 3 | 145-155/.05 mm.ᵃ | C₈H₁₅N₃ | 62.6 (62.7) | 9.8 (9.8) | 27.2 (27.5) | |
| 4 | 35-37 | C₁₂H₂₃N₃ | 68.7 (68.9) | 11.1 (11.0) | 20.0 (20.1) | |
| 5 | 130-140/.05 mm.ᵃ | C₅H₁₁N₃O | 51.5 (51.0) | 8.3 (7.8) | 30.2 (30.1) | |
| 6 | 112-114 | | J. Chem. Soc. (C). 1967. 1666 | | | |
| 7 | 163-165 | | Berichte 29. 2489 (1896) | | | |
| 8 | 98-100 | | Berichte 29. 2487 (1896) | | | |
| 9 | 74-75 | C₅H₉N₃S | 42.2 (41.9) | 6.3 (6.3) | 29.0 (29.4) | 22.2 (22.3) |
| 10 | 67-69 | C₆H₁₁N₃S | 46.0 (45.8) | 7.1 (7.0) | 26.9 (26.8) | 20.25 (20.4) |
| 11 | 199-201 | C₆H₁₁N₃S | 45.8 (45.8) | 7.1 (7.0) | 26.9 (26.8) | 20.2 (20.4) |
| 12 | 38-40 | C₇H₁₃N₃S | 49.0 (49.1) | 7.4 (7.6) | 24.3 (24.6) | 18.9 (18.7) |
| 13 | 56-57 | C₈H₁₅N₃S | 51.8 (51.9) | 7.7 (8.1) | 22.8 (22.7) | 17.4 (17.3) |
| 14 | 61-62 | C₁₀H₁₉N₃S | 56.6 (56.4) | 8.9 (8.9) | 19.6 (19.7) | 15.2 (15.0) |
| 15 | 182-184 | C₁₀H₁₉N₃S | 56.6 (56.4) | 9.0 (8.9) | 20.0 (19.7) | 15.1 (15.0) |
| 16 | 67-68 | C₁₂H₂₃N₃S | 60.0 (59.7) | 9.7 (9.6) | 17.6 (17.4) | 13.3 (13.3) |
| 17 | 164-166 | C₈H₁₃N₃S | 52.7 (52.5) | 7.2 (7.1) | 22.8 (23.0) | 17.8 (17.5) |
| 18 | 118-120 | | Saikochi and Kanaoko Chem. Abstracts 56. 7305 | | | |
| 19 | 171-173 | | Compt. rend. 248. 1677 (1959) | | | |
| 20 | 215-217 (dec.) | C₃H₅N₃OS | 27.5 (27.5) | 4.0 (3.8) | 31.95 (32.1) | 24.6 (24.4) |
| 21 | 152-154 | C₆H₁₁N₃OS | 41.9 (41.6) | 6.45 (6.3) | 24.4 (24.3) | 18.4 (18.5) |
| 22 | 135-136 | | Compt. rend ₋ₓₓ. 1677 (1959) | | | |
| 23 | 101-102 | C₇H₁₃N₃S | 48.9 (49.1) | 7.8 (7.6) | 24.2 (24.6) | 19.1 (18.7) |
| 24 | 192-194 | C₇H₇N₃OS | 46.7 (46.4) | 3.9 (3.9) | 23.5 (23.2) | 17.5 (17.7) |
| 25 | 103-105 | C₁₀H₁₃N₃OS | 53.7 (53.8) | 5.8 (5.8) | 18.9 (18.8) | 14.8 (14.4) |
| 26 | 215 | C₁₂H₉N₃OS | 59.3 (59.3) | 3.95 (3.7) | 17.2 (17.3) | 13.2 (13.1) |
| 27 | 158-160 | C₄H₅N₃O₂S | 30.4 (30.2) | 3.4 (3.1) | 26.7 (26.4) | 19.9 (20.1) |
| 28 | 108-110 | C₇H₁₁N₃O₂S·H₂O | 38.1 (38.4) | 5.9 (5.9) | 19.1 (19.2) | 14.7 (14.6) |
| 29 | 132-134 | C₁₃H₂₆N₄O₂S | 51.8 (51.7) | 8.8 (8.7) | 18.8 (18.5) | 10.9 (10.6) |
| 30 | Soft solid | C₉H₁₅N₃O₂S | 46.7 (47.1) | 6.7 (6.6) | 18.6 (18.3) | 14.4 (14.0) |
| 31 | Hygroscopic solid | | | | | |
| 32 | 106-107 | C₉H₁₄N₄O₃S | 41.8 (40.9) | 6.3 (6.2) | 19.9 (19.2) | 11.4 (10.9) |
| 33 | Concentrate | C₁₅H₂₉N₅O₃S | 50.0 (50.6) | 9.5 (8.1) | 20.9 (19.5) | 7.8 (8.9) |
| 34 | Brown oil | | | | | |
| 35 | 128-131/2 mm.ᵃ | C₇H₁₃N₃S | 49.1 (49.1) | 7.6 (7.6) | 24.6 (24.6) | 19.0 (18.7) |
| 36 | 168-175/2 mm.ᵃ | C₉H₁₄N₄S | 51.2 (51.4) | 6.8 (6.7) | 26.65 (26.7) | 15.1 (15.2) |
| 37 | 147-155/1 mm.ᵃ | C₁₀H₁₉N₃OS | 52.7 (52.3) | 8.2 (8.3) | 18.8 (18.4) | 14.45 (14.0) |
| 38 | 220-230/.25 mm.ᵃ | C₁₄H₁₉N₃OS | 60.9 (60.6) | 7.3 (6.9) | 5.05 (15.2) | 10.9 (11.5) |
| 39 | 95-97 | C₈H₁₂Cl₂N₃OS | 31.8 (31.8) | 4.2 (3.95) | 13.95 (13.8) | 10.8 (10.5) |
| 40 | 74-76 | C₈H₁₄N₄OS | 45.6 (44.8) | 6.3 (6.5) | 26.7 (26.2) | 14.3 (15.0) |
| 41 | 190-205/.03 mm.ᵃ | C₁₄H₁₀N₃OS | 60.6 (60.6) | 7.1 (6.9) | 16.0 (15.2) | 10.95 (11.5) |
| 42 | 105-107 | C₁₂H₁₃N₃O₄S | 44.8 (44.6) | 4.3 (4.0) | 21.5 (21.7) | 20.1 (19.8) |
| 43 | 112-114 | C₈H₁₄N₄OS | 45.1 (44.9) | 6.7 (6.6) | 26.2 (26.2) | 14.8 (14.9) |
| 44 | 143-144 | C₁₃H₁₄BrN₃OS | 46.2 (45.9) | 4.05 (4.1) | 21.4 (12.3) | 9.5 (9.4) |
| 45 | 160-162 | C₁₃H₁₄BrN₃OS | 45.8 (45.9) | 4.0 (4.1) | 12.2 (12.3) | 9.5 (9.4) |
| 46 | 94-96 | C₁₄H₁₇O₂S | 57.7 (57.7) | 5.8 (5.9) | 14.4 (14.4) | 11.0 (11.0) |
| 47 | 114-116 | C₁₃H₁₄N₄O₃S | 51.0 (51.0) | 5.2 (4.6) | 18.3 (18.3) | 10.5 (10.4) |
| 48 | 102-5 | C₁₁H₁₅N₃O₂S | 52.7 (52.6) | 5.5 (5.2) | 16.6 (16.7) | 12.7 (12.8) |
| 49 | 79-82 | C₅H₁₉N₃O₂S | 58.1 (59.1) | 6.4 (6.3) | 13.6 (13.8) | 10.4 (10.5) |
| 50 | 10-102 | | Chemical Abstracts 63. 13242 (1965) | | | |
| 51 | 248-250 | C₁₄H₉N₅O₄S | 49.0 (49.0) | 2.8 (2.6) | 20.3 (20.4) | 9.4 (9.3) |
| 52 | 174-176 | C₁₆H₁₃N₃O₂S | 61.9 (61.8) | 4.25 (4.2) | 13.5 (13.5) | 10.5 (10.3) |
| 53 | 143-146 | C₁₅H₁₀N₄O₃S | 55.35 (55.2) | 3.25 (3.1) | 17.2 (17.2) | 9.9 (9.8) |

¹ The number in parenthesis represents the theoretical value as calculated from the empirical formula.
ᵃ Boiling point in ° C.

Among the structures of this invention which are fungicidal the preferred compounds are those which are novel. Novel structures within this invention may be represented by the structure

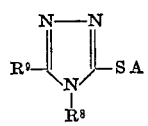

(XII)

wherein A is (a) hydrogen,
(b) lower alkyl groups and lower alkyl groups substituted by halogen, preferably chlorine, lower alkoxy, cyano, hydroxy or nitro; aryloxy; alkoxy, alkyl, halo or nitro substituted aryloxy; aryl; alkoxy, alkyl, halo preferably chloro or nitro substituted aryl; benzoyl and halo preferably chloro, alkoxy, alkyl or nitro substituted benzoyl, (c) the group —C(X)R⁴ wherein X is O or S and R⁴ is selected from the group consisting of aryl, lower alkyl substituted aryl, lower alkoxy substituted aryl, halo and nitro substituted aryl, furoyl, and the —NR⁵R⁶ wherein R⁵ and R⁶ may be hydrogen or lower alkyl groups,
(d) the group —CH₂C(O)NR⁵R⁶ wherein R⁵ and R⁶ have the above meaning,
(e) the group —CH(OH)R⁷ wherein R⁷ is hydrogen, lower alkyl or lower halo-substituted alkyl,
(f) the group

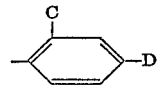

wherein C and D are hydrogen and a meta-directing group such as cyano, nitro, sulfonic acid and sulfonic acid derivatives with the proviso that only one of C and D may be hydrogen, (g) salt-forming metals such as the alkali and alkaline earth metals, cadmium, copper, iron, manganese, nickel and zinc;

When A is hydrogen $R^8$ is alkyl of 3–18 carbon atoms which may be substituted with one or more halo preferably chloro, lower alkoxy, hydroxy or nitro groups; and cycloalkyl of 3–8 carbon atoms which may be substituted with one or more halo preferably chloro, hydroxy or nitro groups;

When A is methyl $R^8$ is alkyl of 3–18 carbon atoms which may be substituted with one or more halo preferably chloro, lower alkoxy, hydroxy or nitro groups; aralkyl of up to 10 carbon atoms and aralkyl of up to 10 carbon atoms in which the aryl group is substituted with lower alkyl, halo preferably chloro and nitro groups;

When A is carbamoylmethyl, benzyl, nitrobenzyl or sodium $R^8$ is alkyl of 1–18 carbon atoms which may be substituted with one or more halo preferably chloro, lower alkoxy, hydroxy or nitro groups; aralkyl of up to 10 carbon atoms and aralkyl of up to 10 carbon atoms in which the aryl group is substituted with lower alkyl, halo preferably chloro and nitro groups;

When A is all other values $R^8$ is alkyl of 1–18 carbon atoms which may be substituted with one or more halo preferably chloro, lower alkoxy, hydroxy or nitro groups; cycloalkyl of 3–8 carbon atoms which may be substituted with one or more halo preferably chloro, hydroxy or nitro groups; aralkyl of up to 10 carbon atoms; aralkyl of up to 10 carbon atoms substituted in the aryl group with lower alkyl, halo preferably chloro, and nitro groups; aryl; and lower alkyl, halo preferably chloro, and nitro substituted aryl; and $R^9$ is hydrogen, alkyl of 1–18 carbon atoms which may be substituted with one or more halo preferably chloro, lower alkoxy, hydroxy or nitro groups, furyl and the group —COOB wherein B is hydrogen, alkyl of 1–12 carbon atoms, ammonium, ammonium monosubstituted with lower alkyl or lower hydroxyalkyl, ammonium disubstituted with lower alkyl or lower hydroxyalkyl, ammonium trisubstituted with lower alkyl or lower hydroxyalkyl, quaternary ammonium and salt-forming metals; and acid salts of the compounds of Formula XII which are basic.

Other novel structures within the scope of this invention and which are preferred fungicides may be depicted by the formula

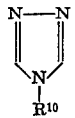

(XIII)

wherein $R^{10}$ is alkyl of 3–18 carbon atoms exclusive of the n-butyl group.

Other novel structures within the scope of this invention which are preferred fungicides may be depicted by the formula

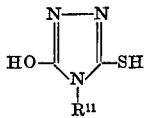

(XIV)

wherein $R^{11}$ is alkyl of 1–18 carbon atoms which may be substituted with one or more halo preferably chloro, alkoxy, hydroxy or nitro groups and cycloalkyl of 3–8 carbon atoms, which may be substituted with one or more halo preferably chloro, hydroxy or nitro groups.

Typical compounds within the scope of Formulas XII, XIII and XIV include the following:

4-isopropyl-1,2,4-triazole
4-sec-butyl-1,2,4-triazole
4-n-pentyl-1,2,4-triazole
4-dodecyl-1,2,4-triazole
4-octadecyl-1,2,4-triazole
3-mercapto-4-isobutyl-1,2,4-triazole
3-mercapto-3-isopentyl-1,2,4-triazole
3-mercapto-4-undecyl-1,2,4-triazole
3-mercapto-4-(4-chlorobutyl)-1,2,4-triazole
3-mercapto-4-(4-methoxypropyl)-1,2,4-triazole
3-mercapto-4-(2-hydroxybutyl)-1,2,4-triazole
3-mercapto-4-(4-nitrobutyl)-1,2,4-triazole
3-mercapto-4-cyclopropyl-1,2,4-triazole
3-methylmercapto-4-(3-chloropropyl)-1,2,4-triazole
3-ethylmercapto-4-butyl-1,2,4-triazole
3-butylmercapto-4-(2-chloropropyl)-1,2,4-triazole
3-chloromethylmercapto-4-butyl-1,2,4-triazole
3-(2-hydroxyethylmercapto)-4-butyl-1,2,4-triazole
3-(2-cyanoethylmercapto)-4-butyl-1,2,4-triazole
3-(2-nitroethylmercapto)-4-butyl-1,2,4-triazole
3-[2-(4-chlorophenoxy)ethylmercapto]-4-butyl-1,2,4-triazole
3-[2-(2-methylphenoxy)ethylmercapto]-4-butyl-1,2,4-triazole
3-[2-(3-nitrophenoxy)ethylmercapto]-4-butyl-1,2,4-triazole
3-benzylmercapto-4-butyl-1,2,4-triazole
3-(4-chlorobenzylmercapto)-4-butyl-1,2,4-triazole
3-(dodecylbenzylmercapto)-4-butyl-1,2,4-triazole
3-phenacylmercapto-4-butyl-1,2,4-triazole
3-(3,5-dichlorophenacylmercapto-4-butyl-1,2,4-triazole
3-benzoylmercapto-4-chloropropyl-1,2,4-triazole
3-(3-nitrobenzoylmercapto)-4-benzyl-1,2,4-triazole
2-carbamoylmercapto-4-benzyl-1,2,4-triazole
3-methylcarbamoylmercapto-4-(4-chlorobenzyl)-1,2,4-triazole
3-dimethylcarbamoylmercapto-4-(2-chloroethyl)-1,2,4-triazole
3-carbamoylmethylmercapto-4-(3-chloropropyl)-1,2,4-triazole
3-carbamoylmethylmercapto-4-(2-methoxybenzyl)-1,2,4-triazole
3-carbamoylmethylmercapto-4-(4-nitrobenzyl)-1,2,4-triazole
3-methylcarbamoylmethylmercapto-4-butyl-1,2,4-triazole
3-hydroxymethylmercapto-4-(2-chlorobutyl)-1,2,4-triazole
3-chloromethylmercapto-4-butyl-1,2,4-triazole
3-(1-hydroxy-2,4-dichloroethylmercapto)-4-(2-chloropropyl)-1,2,4-triazole
3-(2-nitrophenylmercapto)-4-(3-bromopropyl)-1,2,4-triazole
3-(2-cyanophenylmercapto)-4-butyl-1,2,4-triazole
3-(4-sulfonamidophenylmercapto)-4-benzyl-1,2,4-triazole
3-(4-nitrophenylmercapto)-4-(4-chlorobenzyl)-1,2,4-triazole
3-furoylmercapto-4-(3-chloropropyl)-1,2,4-triazole
3-furoylmercapto-4-(2-chlorobenzyl)-1,2,4-triazole
3-mercapto-4-(2-chloroethyl)-5-methyl-1,2,4-triazole
3-mercapto-4-(2-chlorobenzyl)-5-furyl-1,2,4-triazole
3-mercapto-4-(4-chlorobutyl)-5-butyl-1,2,4-triazole
3-mercapto-4-(2-bromopropyl)-5-(2-hydroxyethyl)-1,2,4-triazole
3-mercapto-4-benzyl-5-(2-nitroethyl)-1,2,4-triazole
3-mercapto-4-cyclopentyl-5-hydroxymethyl-1,2,4-triazole
3-methylmercapto-4-butyl-5-methyl-1,2,4-triazole
3-ethylmercapto-4-(3-chloropropyl)-5-chloromethyl-1,2,4-triazole
3-(2-chloroethylmercapto)-4-(2-chloroethyl)-5-carboxy-1,2,4-triazole
3-carbamoylmercapto-4-(3-methoxypropyl)-5-carboxy-1,2,4-triazole
3-(3-methoxypropylmercapto)-4-(4-chlorobenzyl)-5-carboxy-1,2,4-triazole
3-(4-nitrophenylmercapto)-4-(3-bromopropyl)-5-carboxy-1,2,4-triazole
3-(4-methylbenzoylmercapto)-4-octyl-5-hydroxy-1,2,4-triazole
3-mercapto-4-(2-hydroxyethyl)-5-hydroxy-1,2,4-triazole
3-cercapto-4-(2-chlorobutyl)-5-hydroxy-1,2,4-triazole The 1,2,4-triazoles of this invention and salts thereof possess biocidal properties and in this respect are particularly useful as agricultural fungicides. As such, they may be applied to various loci such as the seed, the soil or the foliage. For such purposes the 1,2,4-triazoles may be used in the technical or pure form as prepared, as solutions or as formulations. The compounds are usually taken up in a carrier or are formulated so as to render them suitable for subsequent dissemination as pesticides. For example, the 1,2,4-triazoles may be formulated as wettable powders, emulsifiable concentrates, dusts, granular formulations, aerosols, flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1967 Annual." Of course the surfactant should be selected relative to the specific triazole. In some instances the cationic 1,2,4-triazole salts may be incompatible with anionic surfactants and the anionic 1,2,4-triazole salts may be incompatible with cationic surfactants.

In case the 1,2,4-triazole compound is water-soluble, it may be dissolved directly in water to provide an aqueous solution for application. Similarly, the compounds of this invention may be dissolved in a water-miscible liquid, such as methanol, ethanol, isopropanol, acetone, dimethylformamide or dimethyl sulfoxide or mixtures of these with water and such solutions extended with water. The concentration of the solution may vary from 2% to 98% with a preferred range being 25% to 75%.

For the preparation of emulsifiable concentrates, the compound may be dissolved in organic solvents, such as xylene, pine oil, orthodichlorobenzene, methyl oleate, or a mixture of solvents, together with an emulsifying agent which permits dispersion of the pesticide in water. The concentration of the active ingredient in emulsion concentrates is usually 10% to 25% and in flowable emulsion concentrates, this may be as high as 75%.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%.

Dusts are prepared by mixing the 1,2,4-triazoles with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The 1,2,4-triazoles can be applied as fungicidal sprays by methods commonly employed, such as conventional high-gallonage hydraulic sprays, low gallonage sprays, airblast spray, aerial sprays and dusts. The dilution and rate of application will depend upon the type of equipment employed, the method of application and diseases to be controlled, but the amount is usually 0.1 lb. to 25 lbs. per acre of the active ingredient.

As a seed protectant, the amount of toxicant coated on the seed is usually at a dosage rate of about 0.1 to 20 ounces per hundred pounds of seed. As a soil fungicide the chemical may be incorporated in the soil or applied to the surface usually at a rate of 0.1 to 25 lbs. per acre. As a foliar fungicide the toxicant is usually applied to growing plants at a rate of 0.25 to 10 pounds per acre.

The substituted 1,2,4-triazoles of this invention are also of interest when mixed with fertilizers and fertilizing materials. Such mixtures with fertilizers may be made in a variety of ways. For example, liquid formulations may be sprayed onto particles of mixed fertilizer or of fertilizer ingredients, such as ammonium sulfate, ammonium nitrate, ammonium phosphate, potassium chloride or sulfate, calcium phosphate or urea, singly or in admixture. Also, the toxicants and the solid fertilizing materials may be admixed in mixing or blending equipment. Similarly, a solution of toxicants in a volatile solvent may be applied to particles of fertilizer or fertilizer ingredients. A particularly useful form in which the toxicants are incorporated with fertilizers is in granular formulations. This type of solid composition serves a dual purpose in providing fertilizing material for the rapid growth of desired plants and at the same time helps control fungal diseases in one operation without the necessity of separate applications.

The compounds of this invention were evaluated as foliar fungicides for the control of wheat leaf rust, *Puccinia recondita*. In this test aqueous sprays were applied to about one week old wheat seedlings and the plants were allowed to dry. They were then inoculated with standard spore suspension of the wheat leaf rust organism containing approximately 25,000 spores per ml. The plants were then held under standard conditions for the disease to develop. After about 7–9 days, lesions were counted and compared to those on untreated plants. The percent disease control was calculated. In a related test in order to determine the persistency of the sprays, the treated plants were rained upon for varying times in a standard rain machine in which six minutes of rain was equal to about one inch of rain. Table III gives the results.

TABLE III.—WHEAT LEAF RUST CONTROL BY FOLIAR APPLICATION

| Example number | Percent control (without rain) | | Percent control (with 2″ of rain) | |
|---|---|---|---|---|
| | 1 lb. | 0.25 lb. | 1 lb. | 0.25 lb. |
| 1 | 100 | 100 | 100 | 87 |
| 2 | 100 | 100 | 100 | 100 |
| 3 | 100 | 100 | 100 | 100 |
| 4 | 100 | 57 | 78 | 48 |
| 5 | 100 | 100 | 100 | 99 |
| 6 | 100 | 95 | 100 | 100 |
| 7 | 50 | 34 | 94 | 98 |
| 8 | 60 | 40 | 0 | 0 |
| 9 | 100 | 91 | 99 | 100 |
| 10 | 100 | 100 | 100 | 100 |
| 11 | 100 | 68 | 80 | 57 |
| 12 | 100 | 97 | 100 | 100 |
| 13 | 100 | 100 | 100 | 100 |
| 14 | 100 | 100 | 65 | 51 |
| 15 | 100 | 100 | 86 | 53 |
| 16 | 78 | 61 | 72 | 46 |
| 17 | 34 | 44 | 98 | 100 |
| 18 | 100 | 100 | 100 | 100 |
| 19 | 85 | 80 | 90 | 72 |
| 20 | 99 | 96 | 63 | 63 |
| 21 | 49 | 15 | 0 | 0 |
| 22 | 80 | 73 | 100 | 98 |
| 23 | 51 | 26 | 80 | 57 |
| 24 | 28 | 0 | 87 | 80 |
| 25 | 72 | 41 | 100 | 100 |
| 26 | 81 | 100 | 87 | 100 |
| 27 | 94 | 65 | 0 | 0 |
| 28 | 100 | 100 | 83 | 82 |
| 29 | 99 | 98 | 100 | 100 |
| 30 | 100 | 100 | 100 | 100 |
| 31 | 100 | 86 | 100 | 100 |
| 32 | 99 | 99 | 100 | 100 |
| 33 | 100 | 100 | 100 | 100 |
| 34 | 100 | 100 | 100 | 100 |
| 35 | 100 | 100 | 51 | 51 |
| 36 | 100 | 100 | 100 | 99 |
| 37 | 100 | 100 | 100 | 100 |
| 38 | 100 | 100 | 100 | 96 |
| 39 | 100 | 100 | 100 | 100 |
| 40 | 100 | 100 | 100 | 93 |
| 41 | 100 | 100 | 97 | 98 |
| 42 | 100 | 100 | 100 | 98 |
| 43 | 100 | 100 | 100 | 100 |
| 44 | 100 | 100 | 100 | 100 |
| 45 | 100 | 100 | 100 | 100 |
| 46 | 98 | 90 | 100 | 100 |
| 47 | 100 | 100 | 100 | 100 |
| 48 | 100 | 100 | 100 | 100 |
| 50 | 96 | 93 | 96 | 83 |
| 51 | 100 | 100 | 90 | 84 |
| 52 | 100 | 100 | 99 | 100 |
| 53 | 100 | 97 | | |

Other tests in which the spray was allowed to age for several days before being rained upon demonstrated excellent persistency.
The compounds of this invention which have exhibited excellent systemic activity in the control of cereal rusts are of the structure
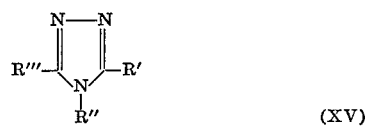
(XV)

wherein R′ is hydrogen or the group —SA wherein A is hydrogen, cyano-substituted lower alkyl, lower alkoxy substituted lower alkyl, the group $—CH(OH)CCl_3$, $—CH_2NR^5R^6$ wherein $R^5$ and $R^6$ are hydrogen or lower alkyl, benzyl, methoxybenzyl, the group $—C(X)NR^5R^6$ wherein X is O or S and $R^5$ and $R^6$ are hydrogen or lower alkyl, methoxybenzoyl, furoyl, 2,4-dinitrophenyl and salt-forming metals; R″ is alkyl of 3 to 6 carbon atoms exclusive of the tert-butyl group, lower alkoxy lower alkyl and benzyl; and R‴ is hydrogen or the —COOB group wherein B is hydrogen, lower alkyl or a metal, ammonium, amine or quaternary ammonium salt-forming group.

The preferred compounds are those in which R″ is a n-butyl group, e.g. 4-n-butyl-1,2,4-triazole, 3-mercapto-4-n-butyl-1,2,4-triazole and 3-mercapto-4-n-butyl-5-carboxy-1,2,4-triazole.

As one test for systemic activity the compounds were evaluated by a root-uptake method. In the root-uptake test one of the active compounds of this invention, contained in a suitable formulation, was incorporated into the soil by either spraying it into a rotating drum of soil, or by drenching the soil. The dosage of active ingredient in the soil ranged from about 50.0 to about 2.5 parts per million (p.p.m.). Seeds of a susceptible wheat variety were planted in the treated soil and allowed to germinate and grow to a height of about 4 inches. The plants were then inoculated with a spore suspension of *Puccinia recondita*. The plants sprayed with spores of the rust fungus were then held at 70° F. in a moist chamber about 16 hours to permit the development of infection. The lesions were allowed to develop about one week and were then counted in comparison to untreated plants and the percent disease control calculated. Similar tests were conducted using the wheat stem rust organism *Puccinia graminis* instead of *Puccinia recondita*. Table IV gives the results.

Another type of evaluation as a systemic fungicide was by seed treatment. In this test wheat seeds were treated with varying dosages of the test compound by mixing 3 cc. of an acetone: methanol (1:1) mixture containing the test compound with 50 grams of seed. The treated seeds were dried and stored for 24 hours. The seeds were planted and nine days after planting were inoculated with a standard spore suspenion of wheat stem rust, *Puccinia graminis*. Lesions were allowed to develop and 9 days after inoculation were counted in comparison with plants produced from untreated seed and the percent disease control calculated. The following Table V gives the results using three rates of application at 0.5 ounce, 1 ounce and 3 ounces of the test compound per 100 lbs. of wheat seed.

TABLE V.—WHEAT STEM RUST CONTROL BY SEED TREATMENT

| Example number | Percent control | | |
|---|---|---|---|
| | 0.5 oz. | 1 oz. | 3 oz. |
| 10 | 97 | 99 | 100 |
| 28 | 88 | 98 | 99 |
| 29 | 88 | 96 | 99 |
| 30 | 75 | 90 | 99 |
| 32 | 97 | 98 | 99 |
| 33 | 83 | 93 | 99 |
| 43 | 93 | 95 | 100 |

In other seed treatment tests almost complete control of wheat leaf rust was obtained with the compounds of this invention thirty days or more after seed treatment.

Another type of systemic test was run in which pots of approximately 5 inch high wheat plants were sprayed with varying concentrations of the test compound. Thirty-six hours later they were sprayed six minutes in a rain machine which amounted to about one inch of normal rainfall. The plants were then placed in a greenhouse for 7 days and then inoculated with a spore suspension of wheat leaf rust, *Puccinia recondita*. About 7 days later lesion counts wer made on ten leaves representing the sprayed leaves and new growth from each replicate and compared with similar pots of wheat plants which were untreated with a chemical and the percent disease control determined. Disease control on the new growth is a measure of systemic activity. The commercial product known by the trademarked named Plantvax, which is

TABLE IV.—SYSTEMIC ACTIVITY BY ROOT-UPTAKE

| Example number | R′ | R″ | R‴ | Percent systemic wheat leaf rust control, p.p.m. in soil | | |
|---|---|---|---|---|---|---|
| | | | | 10 | 5 | 2.5 |
| 1 | H | $C_3H_7$ | H | ---------- | 100 | 99 |
| 2 | H | $—C_4H_9$ | H | 100 | 100 | 100 |
| 3 | H | $C_6H_{13}$ | H | ---------- | 92 | 77 |
| 5 | H | $—CH_2CH_2CH_2OCH_3$ | H | ---------- | 99 | 96 |
| 6 | H | $—CH_2C_6H_5$ | H | 99 | 98 | 96 |
| 9 | SH | $C_3H_7$ | H | 84 | 82 | 40 |
| 10 | SH | $C_4H_9$ | H | 100 | 97 | 83 |
| 12 | —SH | $C_5H_{11}$ | H | 97 | 97 | 97 |
| 13 | SH | $C_6H_{13}$ | H | 54 | 0 | 0 |
| 18 | —SH | $CH_2C_6H_5$ | H | 64 | 34 | 0 |
| 28 | —SH | $C_4H_9$ | COOH | 100 | 99 | 95 |
| 29 | —SH | $C_4H_9$ | $COONH(CH_2CH_2OH)_3$ | 100 | 99 | 98 |
| 30 | —SH | $C_4H_9$ | $COOC_2H_5$ | 100 | 95 | 93 |
| 31 | —SNa | $C_4H_9$ | $COOC_2H_5$ | 99 | 97 | 85 |
| 32 | $—SC(O)NHCH_3$ | $C_4H_9$ | COOH | 100 | 99 | 96 |
| 33 | $—SC(O)NHCH_3$ | $C_4H_9$ | $COONH(CH_2CH_2OH)_3$ | 99 | 99 | 89 |
| 34 | $—SC(S)N(CH_3)_2$ | $C_4H_9$ | COOH | 100 | 96 | 88 |
| 36 | (2-(2-cyanoethyl)-4-n-butyl-1,2,4-triazoline-3-thione) | | | 92 | 86 | 82 |
| 37 | $—SCH_2CH_2OC_2H_5$ | $C_4H_9$ | H | 89 | 85 | 52 |
| 39 | $—SCH(OH)CCl_3$ | $C_4H_9$ | H | 100 | 100 | 98 |
| 40 | $—SCH_2C(O)NH_2$ | $C_4H_9$ | H | 92 | 91 | 76 |
| 41 | $—SCH_2C_6H_4OCH_3$-4 | $C_4H_9$ | H | 72 | 71 | 64 |
| 42 | $—SC_6H_3(NO)_2$-2,4 | $C_4H_9$ | H | 100 | 94 | 67 |
| 43 | $—SC(O)NHCH_3$ | $C_4H_9$ | H | 100 | 100 | 96 |
| 46 | $—SC(O)C_6H_4OCH_3$-4 | $C_4H_9$ | H | 100 | 100 | 98 |
| 48 | —S—furoyl | $C_4H_9$ | H | 99 | 99 | 94 |
| 49 | $—SCH_2COC_6H_4OCH_3$-4 | $C_4H_9$ | H | 44 | 68 | 55 |

2,3-dihydro-5-carboxanilido - 6 - methyl-1,4-oxathiin-4,4-dioxide, was used as a standard. Table VI gives the results.

TABLE VI.—FOLIAR SYSTEMIC ACTIVITY

| Treatment | Percent rust control | | | | | |
|---|---|---|---|---|---|---|
| | Sprayed leaf (lb./100 gal.) | | | New growth (lb./100 gal). | | |
| | 1/2 | 1/6 | 1/12 | 1/2 | 1/6 | 1/12 |
| Example number: | | | | | | |
| 2 | 99 | 99 | 97 | 100 | 98 | 85 |
| 6 | 99 | 76 | 42 | 87 | 54 | 46 |
| 10 | 97 | 88 | 80 | 90 | 77 | 75 |
| 12 | 98 | 96 | 91 | 92 | 79 | 57 |
| 13 | 96 | 88 | 85 | 65 | 48 | 38 |
| 18 | 78 | 63 | 54 | 54 | 34 | 36 |
| 28 | 99 | 91 | 71 | 86 | 73 | 61 |
| 29 | 90 | 78 | 46 | 90 | 75 | 63 |
| 30 | 86 | 73 | 81 | 54 | 75 | 67 |
| 32 | 69 | 74 | 81 | 82 | 69 | 56 |
| 33 | 79 | 79 | 57 | 79 | 63 | 54 |
| 37 | 73 | 27 | 25 | 61 | 23 | 17 |
| 40 | 88 | 51 | 49 | 88 | 59 | 38 |
| 42 | 98 | 93 | 81 | 81 | 69 | 57 |
| 43 | 96 | 83 | 68 | 98 | 79 | 67 |
| 46 | 95 | 81 | 91 | 92 | 79 | 77 |
| 50 | 13 | 0 | 0 | 42 | 27 | 0 |
| Plantvax | 49 | 37 | 3 | 38 | 32 | |

A field test was conducted in which 3-mercapto-4-n-butyl-1,2,4-triazole (the compound of Example 10), Plantvax and maneb (manganese ethylenebisdithiocarbamate) were evaluated for the control of leaf rust on winter wheat planted in September. Applications of the chemicals were made the following April when the wheat was 16–24 inches tall and in the boot stage. The volume of spray was 40 gallons per acre. Forty-six days after application lesion counts were made of 200 leaves per plot for four replications and compared with check (untreated) plots. This gives a measure of systemic control. Table VII gives the results.

TABLE VII.—SYSTEMIC FIELD TEST

| Treatment | Lbs./acre | Number of lesions/ 800 leaves |
|---|---|---|
| Example 10 | 2 | 89 |
| | 1 | 239 |
| | 0.5 | 453 |
| Plantvax | 2 | 690 |
| | 1 | 1,017 |
| | 0.5 | 1,113 |
| Untreated | | 1,109 |

A field test was conducted in which the compound of Example 10, the compound of Example 28, and Plantvax were evaluated for the control of leaf rust on spring wheat planted on May first. Forty one days after planting spray applications of the chemicals were made in a dosage series. Thirty-six days after treatment the disease control was evaluated by determining the percent leaves infected. Table VIII gives the results.

TABLE VIII.—SYSTEMATIC FIELD TEST

| Treatment | Lbs./acre | Percent leaves infected |
|---|---|---|
| Example 10 | 0.5 | 23 |
| | 1 | 10 |
| | 2 | 4 |
| Example 28 | 0.5 | 35 |
| | 1 | 17 |
| | 2 | 7 |
| Plantvax | 0.5 | 79 |
| | 1 | 78 |
| | 2 | 75 |

Representative compounds of this invention have given good control of various fungal organisms. For example, compounds of the type

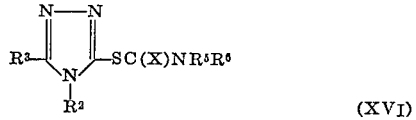

(XVI)

wherein $R^2$ is lower alkyl, $R^3$ is hydrogen and carboxy and its triethanol amine salts, $R^5$ and $R^6$ are hydrogen or lower alkyl, and X is O or S have given 80% or better kills of Phytophthora infestans at 1200 p.p.m. The compound 3 - ( 4 - methoxybenzylmercapto)-4-butyl-1,2,4-triazole gave 50–85% control of Botrytis cinerea on broad bean at 1200 p.p.m. When beets were grown in a soil containing 200 p.p.m. of 3-(4-methoxybenzoylmercapto)-4-butyl-1,2,4-triazole, an excellent control of Pythium ultimum was obtained.

The compounds of this invention may be utilized as the sole biocidal agents, alone or in admixture, or they may be employed in conjunction with other fungicides or with insecticides, miticides, bird repellents and comparable pesticides.

Fungicides which may be combined with the 1,2,4-triazoles of this invention include dithiocarbamates and derivates such as ferric dimethyldithiocarbamates (ferbam), zinc dimethyldithiocarbamate (ziram), manganese ethylenebisdithiocarbamate (maneb) and its coordination product with zinc ion, zinc ethylenebisdithiocarbamate (zineb) tetramethylthiuram disulfide (thiram) and 3,5-dimethyl-1,3,5-2H-tetrahydrothiadiazine-2 - thione; nitrophenol derivatives such as dinitro-(1-methylheptyl)phenyl crotonate (dinocap), 2-sec-butyl-4,6-dinitrophenyl 3,3-dimethylacrylate (binapacryl) and 2-sec-butyl-4,6-dinitrophenyl 3,3-dimethylacrylate (binapacryl) and 2-sec-butyl-4,6-dinitrophenyl isopropyl carbonate; heterocyclic structures such as N-trichloromethylthiotetrahydro-phthalimide (captan),
N-trichloromethylthiophthalimide (folpet),
2-heptadecyl-2-imidazoline (glyodin),
2,4-dichloro-6-(o-chloroanilino)-s-triazine,
diethyl phthalimidophosphorothioate,
5-amino-1-[bis(dimethylamino)phosphinyl]-3-phenyl-1,2,4-triazole,
5-ethoxy-3-trichloromethyl-1,2,4-thiadiazole,
2,3-dicyano-1,4-dithiaanthraquinone (dithianon),
2-thio-1,3-dithio-[4,5-b]quinoxaline (thioquinox),
1-(butylcarbamoyl)-2-benzimidiazole carbamic acid methyl ester,
4-(2-chlorophenylhydrazono)-3-methyl-5-isoxazolone,
pyridine-2-thiol-1-oxide,
8-hydroxyquinoline,
2,3-dihydro-5-carboxanilido-6-methyl-1,4-oxathiin-4,4-dioxide, and
bis(p-chlorophenyl)-3-pyridinemethanol; and miscellaneous fungicides such as dodecylguanidine acetate (dodine),
3-[2-(3,5-dimethyl-2-oxycyclohexyl)-2-hydroxyethyl] glutarimide (cycloheximide),
phenylmercuric acetate,
N-ethylmercuri-1,2,3,6-tetrahydro-3,6-endomethano-3,4,5,6,7,7-hexachlorophthalimide,
phenylmercuric monoethanolammonium lactate,
2,3-dichloro-1,4-naphthoquinone,
1,4-dichloro-2,5-dimethoxybenzene,
p-dimethylaminobenzenediazo sodium sulfonate,
2-chloro-1-nitropropane, polychloronitrobenzenes such as pentachloronitrobenzene, methyl isothiocyanate, fungicdal antibotics such as griseofulvin or kasugamycin, tetrafluorodichloroacetone, 1-phenylthiosemicarbazide, Bordeaux mixture, nickel-containing compounds and sulfur.

We claim:
1. A method for treating a locus to be protected from phytopathogenic fungi which comprises applying to the locus a fungicidally effective amount of a composition which comprises a carrier and as the active ingredient a compound selected from the group consisting of (1) substituted 1,2,4-triazoles having the following formula and (2) the acid salts of those triazoles which are basic

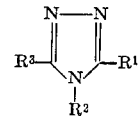

wherein

R¹ is hydrogen or an —SA radical wherein A is selected from the group consisting of
  (a) hydrogen
  (b) alkyl of 1 to 5 carbon atoms, alkyl of 1 to 5 carbon atoms substituted by (1) chlorine, (2) alkoxy of 1 to 5 carbon atoms, (3) cyano, (4) hydroxy, (5) nitro, (6) phenoxy, (7) benzoyl or (8) benzoyl substituted with chloro, nitro or methoxy,
  (c) —C(X)R⁴ wherein X is O or S and R⁴ is selected from the group consisting of (1) phenyl, (2) phenyl substituted with bromo, chloro, methoxy, or nitro, (3) furoyl, and (4) the radical —NR⁵R⁶ wherein R⁵ and R⁶ may be hydrogen or alkyl of 1 to 5 carbon atoms,
  (d) —CH₂C(O)NR⁵R⁶ wherein R⁵ and R⁶ have the above meaning,
  (e) —CH(OH)R⁷ wherein R⁷ is hydrogen, alkyl of 1 to 5 carbons, or trichloromethyl,
  (f)

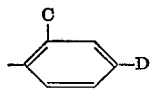

wherein C and D are selected from the group consisting of hydrogen, cyano, nitro, and sulfonic acid with the proviso that only one of C and D may be hydrogen, and
  (g) salt-forming alkali metals,
R² is (a) alkyl of 1–10 carbon atoms which may be substituted with methoxy, (b) benzyl or (c) phenyl, and R³ is hydrogen, alkyl or 1–18 carbon atoms, hydroxy, furyl, or —COOB wherein B is hydrogen, alkyl of 1–12 carbon atoms, ammonium, ammonium monosubstituted with alkyl or hydroxyalkyl of 1 to 5 carbon atoms, ammonium disubstituted with alkyl or hydroxyalkly of 1 to 5 carbon atoms, quaternary ammonium or salt-forming alkali metals.

2. A method of according to claim 1 in which the said fungus is a rust fungus.

3. A method according to claim 1 in which the said locus is a seed.

4. A method according to claim 1 in which the said locus is the soil.

5. A method according to claim 1 in which the said locus is plant foliage.

6. A method for treating a locus to be protected from phytopathogenic fungi in accordance with claim 1 in which R¹ and R³ of said active ingredient are hydrogen and R² is alkyl of 1–10 carbon atoms.

7. A method according to claim 6 wherein R² in said active ingredient is alkyl of 3–6 carbon atoms.

8. A method according to claim 6 wherein said active ingredient is 4-n-butyl-1,2,4-triazole.

9. A method according to claim 1 wherein R¹ in said active ingredient is a mercapto group, R² is alkyl of 3–6 carbon atoms and R³ is hydrogen.

10. A method according to claim 1 wherein said active ingredient is 3-mercapto-4-n-butyl-1,2,4-triazole.

11. A method according to claim 1 wherein said active ingredient is 3 - mercapto - 4-n-butyl-5-carboxyl-1,2,4-triazole.

12. A method for systemically treating a locus to protect it from a cereal rust which consists in applying to the locus to be protected a fungicidally effective amount of a compound of the formula

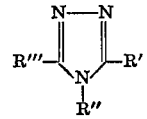

wherein

R' is hydrogen of the radical —SA wherein A is selected from the group consisting of hydrogen, alkyl of 1 to 5 carbon atoms substituted with cyano or alkoxy of 1 to 5 carbon atoms, —CH(OH)CCl₃, —CH₂NR⁵R⁶ wherein R⁵ and R⁶ are hydrogen or alkyl of 1 to 5 carbon atoms, benzyl, methoxybenzyl, —C(X)NR⁵R⁶ wherein X is O or S and R⁵ and R⁶ are hydrogen or alkyl of 1 to 5 carbon atoms, methoxybenzoyl, furoyl, 2,4-dinitrophenyl and salt-forming alkali metals;

R" is benzyl, propyl, isopropyl, butyl, isobutyl, sec-butyl, a pentyl radical, a hexyl radical, or alkyl of 1 to 5 carbon atoms substituted with alkoxy of 1 to 5 carbon atoms; and R''' is hydrogen or —COOB wherein B is hydrogen, alkyl of 1 to 5 carbon atoms or a salt-forming hydroxyethylammonium radical.

13. A method according to claim 12 in which the said rust is a rust of wheat.

References Cited
UNITED STATES PATENTS 2,800,486   7/1957   Grundmann et al. __ 260—308 R
3,444,162   5/1969   Hyatt _____ 424—269

OTHER REFERENCES

Chemical Abstracts 57: 3982a (1962).
Chemical Abstracts 49:3949d.
Chemical Abstracts 67: 90738g.

ALBERT T. MEYERS, Primary Examiner

N. A. DREZIN, Assistant Examiner

U.S. Cl. X.R.

260—308 R

UNITED STATES PATENT OFFICE
CERTIFICATE OF CORRECTION

Patent No. 3,769,411  Dated October 30, 1973

Inventor(s) Michael C. Seidel, William C. vonMeyer and Stanley A. Greenfield

It is certified that error appears in the above-identified patent and that said Letters Patent are hereby corrected as shown below:

In the specification make the following changes:

Column 3, lines 21-25, the formula should read

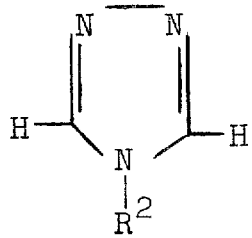

Column 3, line 39, the first formula in the equation should read OCHNHNHCHO.

Columns 11 and 12 in Table II opposite Example 22, the literature reference should read Compt. rend. 248,1677 (1959), and Column 19, line 54, the first word in the heading of Table VIII should read SYSTEMIC.

Signed and sealed this 23rd day of April 1974.

(SEAL)
Attest:

EDWARD M. FLETCHER, JR.
Attesting Officer

C. MARSHALL DANN
Commissioner of Patents